United States Patent
Nakamura (10) Patent No.: US 6,243,563 B1
(45) Date of Patent: Jun. 5, 2001

(54) WIRELESS DEVICE FOR HIGH POWER TRANSMISSION RADIO SIGNAL

(75) Inventor: Taisuke Nakamura, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/097,661

(22) Filed: Jun. 16, 1998

(30) Foreign Application Priority Data

Jun. 17, 1997 (JP) .................................................. 9-160268

(51) Int. Cl.[7] .................................................. H04B 1/44
(52) U.S. Cl. ............................ 455/78; 455/82; 455/277.1
(58) Field of Search ............................ 455/70, 101, 129, 455/272, 277.1, 280, 78, 79, 82, 85, 86; 370/278.1, 282, 294, 321

(56) References Cited

U.S. PATENT DOCUMENTS

| | | | |
|---|---|---|---|
| 5,241,701 | * 8/1993 | Andoh | 455/272 |
| 5,446,922 | * 8/1995 | Siwiak et al. | 455/277.2 |
| 5,692,019 | * 11/1997 | Chang et al. | 375/347 |
| 5,701,595 | * 12/1997 | Green, Jr. | 455/83 |
| 5,715,525 | * 2/1998 | Tarusawa et al. | 455/101 |
| 5,787,122 | * 7/1998 | Suzuki | 455/277.1 X |
| 5,799,245 | * 8/1998 | Ohashi | 455/69 |
| 5,933,122 | * 8/1999 | Sauer et al. | 455/78 |
| 5,970,061 | * 10/1999 | Kokudo | 455/67.1 X |
| 6,108,526 | * 8/2000 | van der Plas | 455/78 |

FOREIGN PATENT DOCUMENTS

| | | | |
|---|---|---|---|
| 5-83175 | 4/1993 | (JP) | H04B/7/08 |
| 6-6275 | 1/1994 | (JP) | . |
| 8-204622 | 8/1996 | (JP) | H04B/7/04 |
| 8-330996 | 12/1996 | (JP) | H04B/1/18 |
| 9-18398 | 1/1997 | (JP) | H04B/7/08 |
| 9-149011 | 6/1997 | (JP) | H04L/1/02 |
| 9-232932 | 9/1997 | (JP) | H03K/17/76 |
| 9-247061 | 9/1997 | (JP) | H04B/7/02 |

OTHER PUBLICATIONS

Derwent Abstract for JP 9–149011A Jun. 1997*

* cited by examiner

*Primary Examiner*—Nay Maung
(74) *Attorney, Agent, or Firm*—Sughrue, Mion, Zinn, Macpeak & Seas, PLLC (57) ABSTRACT

A wireless device includes a switching portion which has a common switch (4) operated in both transmission and reception of radio signals and a reception dedicated switch (3) operated only in signal reception. A switch controller (11) is also included in the wireless device and controls the common switch to connect between the transmitting portion and one of the antennas that is selected and further controls the reception dedicated switch to separate the receiving portion from the common switch on signal transmission. The switch controller further controls both the common switch and the reception dedicated switch to connect between the receiving portion and one of the antennas that is designated on signal reception.

9 Claims, 5 Drawing Sheets

WIRELESS DEVICE FOR HIGH POWER TRANSMISSION RADIO SIGNAL

BACKGROUND OF THE INVENTION

This invention relates to a wireless device for high power transmission radio signal, which is for use in a TDMA (time division multiple access) system and a diversity reception system. Herein, it is to be noted that the wireless device can prevent any deterioration of local oscillator characteristics or transmission characteristics, and more prevent any breakage of parts such as transistors, filters or the like of receiver, due to occurrence of high power transmission radio signals.

Conventionally, the wireless device for use in the TDMA system is liable to undesirably cross or turn transmission signals from a transmitting portion into a receiving portion and into even a local oscillator through an antenna common switch, which is used in common to both reception and transmission signal paths. Such crossed transmission signals will be called cross components. In most of such the wireless devices, the high power transmission signal deteriorates not only local oscillator characteristics due to the cross components but also transmission characteristics. Furthermore, it often happens that a high power level of transmission signal breaks transistors, filters and the like which construct the receiving portion due to the cross components of the high power transmission radio signals.

In order to remove an interference of such cross components or interference, the wireless device has a BPF (band pass filter) which allows only the receiving signal frequency to pass therethrough. With this structure, the BPF can attenuate the transmission signal with a high level and then prevent the cross components of the transmission signal.

Another wireless device has been described in a Japanese Unexamined Patent Publication No. Hei 6-6275, namely, 6275/1994. The wireless device described in this publication can prevent such the transmission signal from being crossed into the receiving portion.

Figure 1:
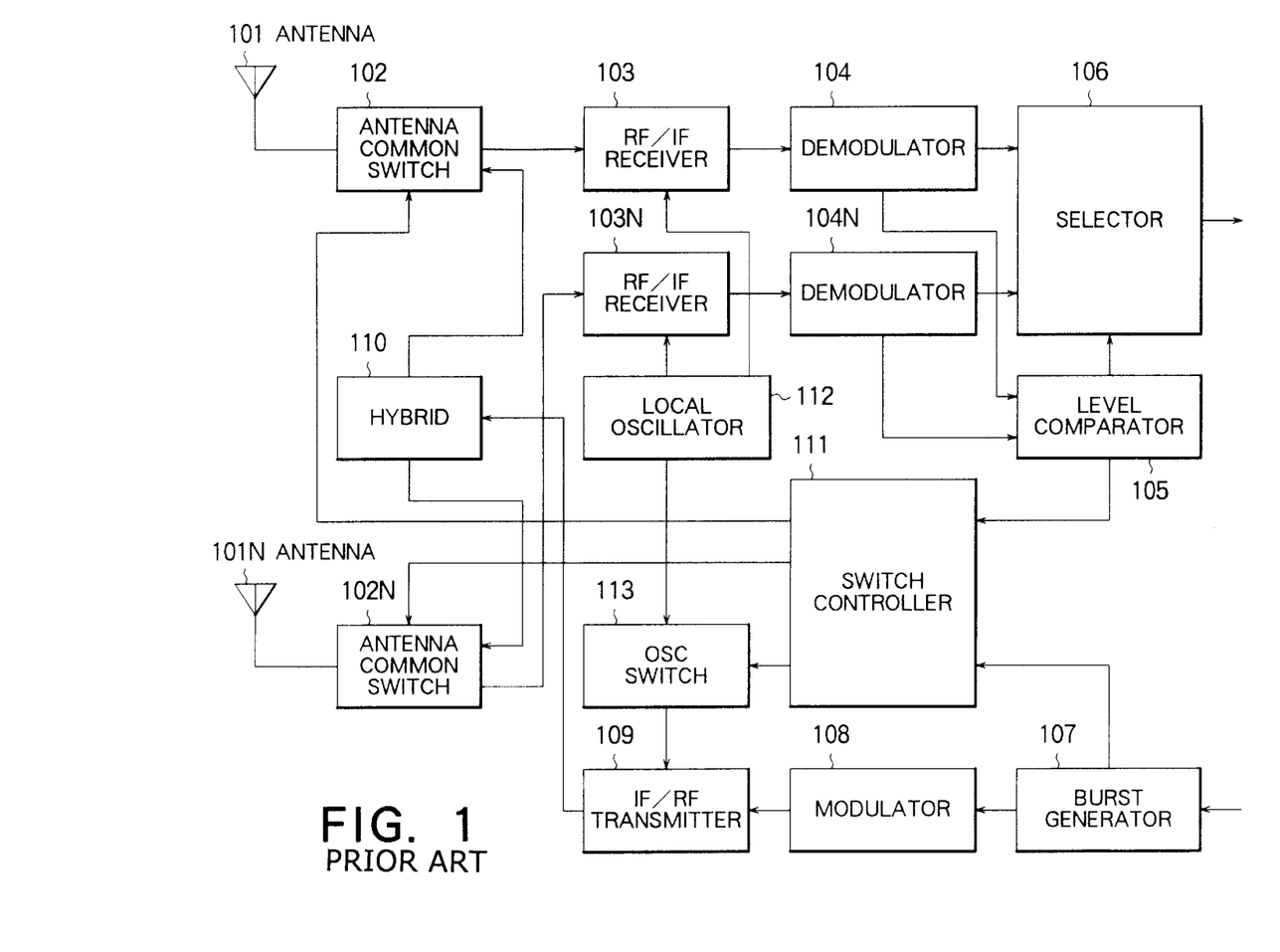
FIG. 1 is a block diagram of one example of a conventional wireless device.

Referring to FIG. 1, the wireless device comprises a plurality of antennas 101 and 101N, a plurality of antenna common switches 102 and 102N, a receiving portion, a transmitting portion and a switch controller 111. Each of the antenna common switches 102 and 102N switches connections between the antenna 101 or 101N and the receiving portion and between the antenna 101 or 101N and a hybrid 110 of the transmitting portion for radio signals from one to another. The receiving portion performs a reception diversity for the antennas 101 and 101N, while the transmitting portion performs a transmission diversity by the use of the antenna 101 or 101N selected by the reception diversity.

The receiving portion comprises RF/IF (radio frequency/intermediate frequency) receivers 103 and 103N, demodulators 104 and 104N, a level comparator 105, and a selector 106. The RF/IF receiver 103 and the demodulator 104 are provided for each of the antenna common switches 102 and 102N. The level comparator 105 compares signal levels measured by the demodulators 104 and 104N with each other and decides one of the RF/IF receivers 103 and 103N by reception diversity. And the selector 106 selects one of the outputs sent from the demodulators 104 and 104N in accordance with the information from the level comparator 105.

On the other hand, the transmission portion comprises a burst generator 107, a modulator 108, and an IF/RF transmitter 109. The burst generator 107 produces burst signals from carrier signals. The modulator 108 modulates the burst signals by the IF (intermediate frequency). The IF/RF transmitter 109 converts the IF modulated signals into the RF (radio frequency) which is send to a hybrid 110 as radio signals.

The hybrid 110 distributes the RF signals or the radio signals to all of the antennas 101 and 101N, respectively. The switch controller 111 controls the antenna common switches 102 and 102N each of which connects between the antenna 101 or 101N and each reception portion correspondingly for the reception diversity. Then, by the switch controller 111, the antenna common switch 102 or 102N connects the RF/IF receiver 103 or 103N with an antenna 101 or 101N selected by the information from the level comparator 105, under control of the switch controller 111 when the radio signal is received. On transmission, the switch controller 111 controls the antenna common switch 102 or 102N to connect the transmission portion to the same antenna 101 or 101N used in the reception of the radio signal. Thus, the diversity transmission is carried out.

The local oscillator 112 generates local oscillation signals for use in frequency conversion of signals supplied to the RF/IF receivers 103 and the IF/RF transmitter 109. However, in the above-described publication, an oscillator switch 113 is located between the local oscillator 112 and the IF/RF transmitter 109. As a result, the local oscillator 112 is connected with the IF/RF transmitter 109 only on the transmission of radio signals to the antenna 101 or 101N.

In the case where the radio signal is transmitted by the use of the above-described construction, the local oscillation signals are given from the local oscillator 112 to the transmitting portion, and are rendered into the transmission radio signals which are sent out from the antenna 101 or 101N selected by the reception diversity.

On the other hand, during the signal reception, the transmission of the radio signals from the transmitting portion to the antenna, is stopped. Accordingly, during the reception of the radio signals, even if isolation among the antennas, the receiving portion, and the transmitting portion is not sufficient, it is possible to protect the transmission radio signals from being crossed into the signal reception side. And with this structure, good diversity can be accomplished on signal reception.

However, during the transmission of the radio signal, it is difficult to prevent the transmission radio signal from being crossed into the receiving portion, if the isolation is insufficient.

In the wireless device described above, the high power transmission radio signal is inevitably given to the local oscillator through the signal receiving portion. Therefore, the BPF is provided for attenuating the transmission signal within the predetermined frequency band. However, such a BPF is difficult to be designed and complicated in structure. Accordingly, the wireless device is complicated in structure and expensive.

SUMMARY OF THE INVENTION

It is therefore an object of this invention to provide a wireless device, which is used for a high power transmission radio signal, and which can prevent any breakage of structure elements due a high power transmission radio signal and which is inexpensive and small in size.

According to an aspect of this invention, a wireless device for high power transmission radio signal comprises a plurality of antennas, transmitting portion, receiving portion, switching portion, and switch controller. Especially, the first point is the switching portion which has a common switch and a reception dedicated switch.

The common switch is provided between the antennas and the transmitting portion, connects between the transmitting portion and one of the antennas which is designated on signal transmission. The common switch further connects between each of the antennas and the receiving portion on signal reception. The reception dedicated switch is provided between the common switch and the receiving portion and connects between the common switch and the receiving portion on signal reception.

The switch controller controls the common switch to connect between the transmitting portion and one of the antennas which is selected and further controls the reception dedicated switch to separate the receiving portion from the common switch on signal transmission. The switch controller further controls both the common switch and the reception dedicated switch to connect between the receiving portion and one of the antennas which is designated on signal reception.

The construction described above can separate the reception signal path from the transmission signal path by two stage of both the common switch and the reception dedicated switch. Therefore, BPF is unnecessary and the wireless device is inexpensive and small in size.

According to another aspect of this invention, a wireless device comprises the receiving portion which measures RSSI (received signal strength intensity) of radio signals sequentially received from all the antennas and informs the switch controller of RSSI. Then, the switch controller further controls the all switches to connect between the receiving portion and each of all the antennas sequentially according to previous designation. Consequently, the switch controller receives and compares RSSI from the receiving portion and selects one of the antennas with highest RSSI before burst signal reception slot. And then, the switch controller further controls the switches to connect between the receiving portion and the selected antenna on signal reception. This is capable of the diversity reception for radio signal.

According to another aspect of this invention, a wireless device comprises the reception dedicated antenna which is one of the antennas and which is connected with the reception dedicated switch for use of reception dedication. Then, the switch controller further controls the reception dedicated switch to connect between the receiving portion and the reception dedicated antenna, on all time of signal transmission and at the time when this antenna is designated on signal reception. This is capable of simplification of the switching control of each antennas for the switch controller.

DESCRIPTION OF THE PREFERRED EMBODIMENT

Hereafter, description will be made about embodiments of this invention with reference to the drawings.

Figure 2:
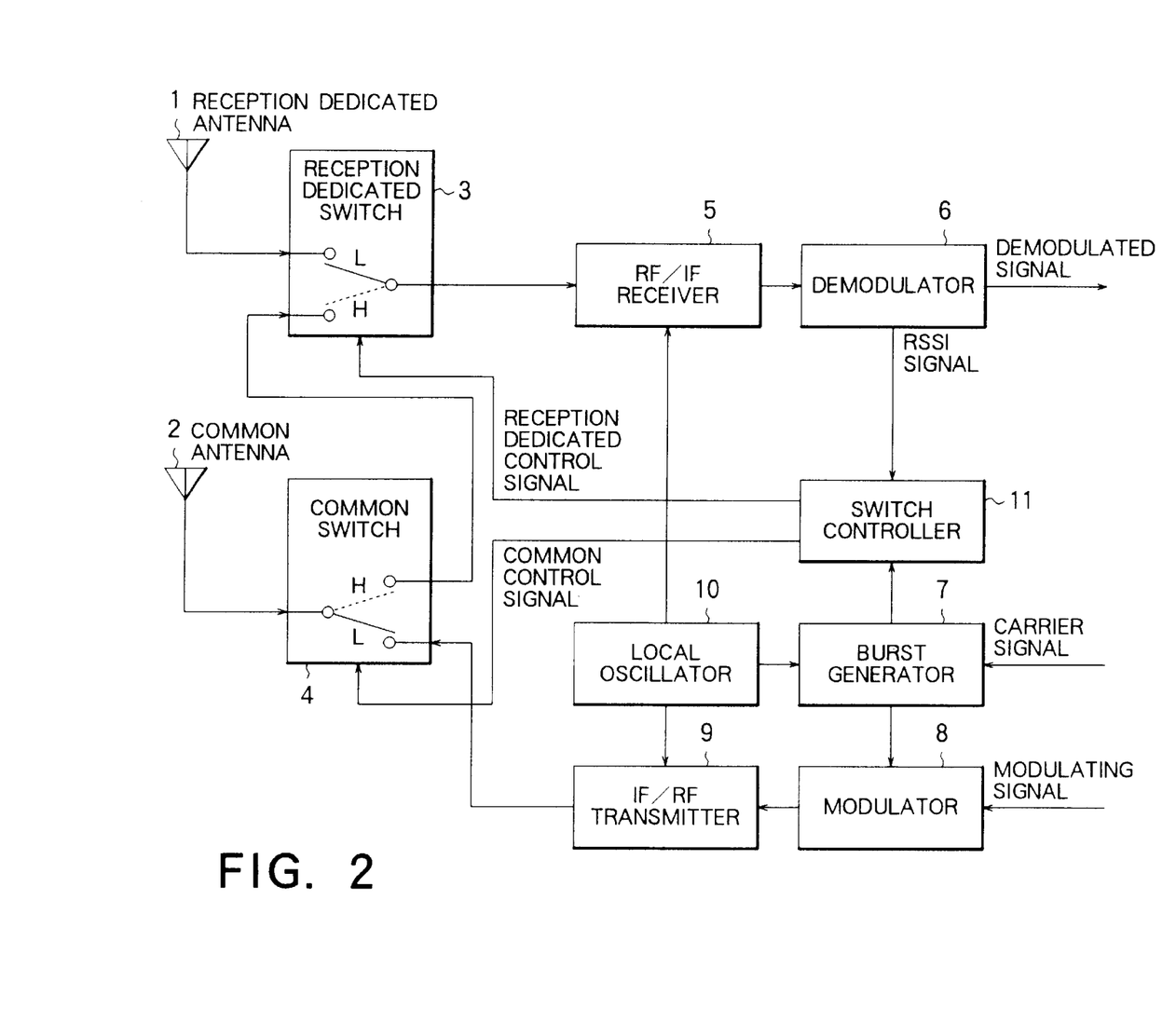
FIG. 2 is a block diagram of a wireless device according to a first embodiment of the invention.

Referring to FIG. 2, a wireless device according to a first embodiment of the invention is used to transmit high power transmission radio signals in a TDMA (time division multiple access) system and a diversity reception system.

The wireless device comprises a reception dedicated antenna 1, a common antenna 2, a radio frequency switching portion, a receiving portion, a transmitting portion, a local oscillator 10, and a switch controller 11. The radio frequency switching portion comprises a reception dedicated switch 3 and a common switch 4 used in transmission and reception. The receiving portion comprises an RF/IF (radio frequency/ intermediate frequency) receiver 5 and a demodulator 6, and the transmitting portion comprises a burst generator 7, modulator 8, and an IF/RF transmitter 9.

The different points from the conventional device described above are as follows.

The receiving portion comprises only one set of an RF/IF receiver 5 and a demodulator 6 for a plurality of antennas 1 and 2. The illustrated switching portion comprises two switches one of which is the common switch 4 to be provided between the antennas used for signal transmission and the transmitting portion. The common switch 4 passes radio signals through from a connected antenna to the side of the receiving portion for signal reception, and passes radio signals through from the transmitting portion to the connected antenna for signal transmission. The other one is a reception dedicated switch 3 to be provided between the common switch 4 and the receiving portion. The reception dedicated switch 3 connects the receiving portion with an antenna for reception dedication or one of the antennas through the common switch 4. Accordingly, during transmission of the radio signals, the signal path connected with the receiving portion can be separated from a signal path between the transmitting portion and an antenna to be used in transmission of radio signals.

The reception dedicated antenna 1 is connected with the reception dedicated switch 3 and the common antenna 2 is connected with the common switch 4.

The reception dedicated switch 3 switches two connections from one to another. One of the connections is formed between the RF/IF receiver 5 and the reception dedicated antenna 1. The other one connection is formed between the RF/IF receiver 5 and the common switch 4. The common switch 4 switches also between two connections. One of the connections is laid between the IF/RF transmitter 9 and the common antenna 2. The other one connection is laid between the common antenna 2 and the reception dedicated switch 3.

The RF/IF receiver 5 successively receives radio signals at the reception dedicated antenna 1 and the common antenna 2. The radio signal is sent through the reception dedicated switch 3 and the radio signal from the common antenna 2 is sent through both switches of the reception dedicated switch 3 and the common switch 4, from the reception dedicated antenna 1 to the RF/IF receiver 5. The radio signal are converted in frequency to IF signals by the use of a difference of the frequency between the radio signals and the local oscillation signal from the local oscillator 10.

The demodulator 6 demodulates output signals received from the RF/IF receiver 5 into demodulated signal. The demodulator 6 sequentially measures and calculates the RSSI (received signal strength intensity) of the radio signals received from antennas 1 and 2 in order and sends out RSSI signals corresponding to the RSSI, respectively, to the switch controller 11. One of the two calculated RSSI may be called a reception dedicated RSSI according to the reception dedicated antenna 1 while the other may be called a common RSSI according to the common antenna 2. Similarly, the two RSSI signals may be called a reception dedicated RSSI signal and a common RSSI signal.

The burst generator 7 generates burst signals in response to carrier signals, sends the burst signals to the modulator 8, and informs the switch controller 11 of a transmission slot of the burst signals. The modulator 8 modulates the carrier signals received from the burst generator 7 by the modulating signals, and sends the modulated signals to the IF/RF transmitter 9. Being responsive to the IF modulated signals received from modulator 8 and the local oscillation signals received from the local oscillator 10, the IF/RF transmitter 9 transmits the radio signals to the common antenna 2 through the common switch 4.

The local oscillator 10 sends local oscillation signals to both RF/IF receiver 5 and IF/RF transmitter 9 for conversion between RF and IF. The switch controller 11 controls connecting and switching operations of the two switches. This switching control operation will be described later.

Figure 3:
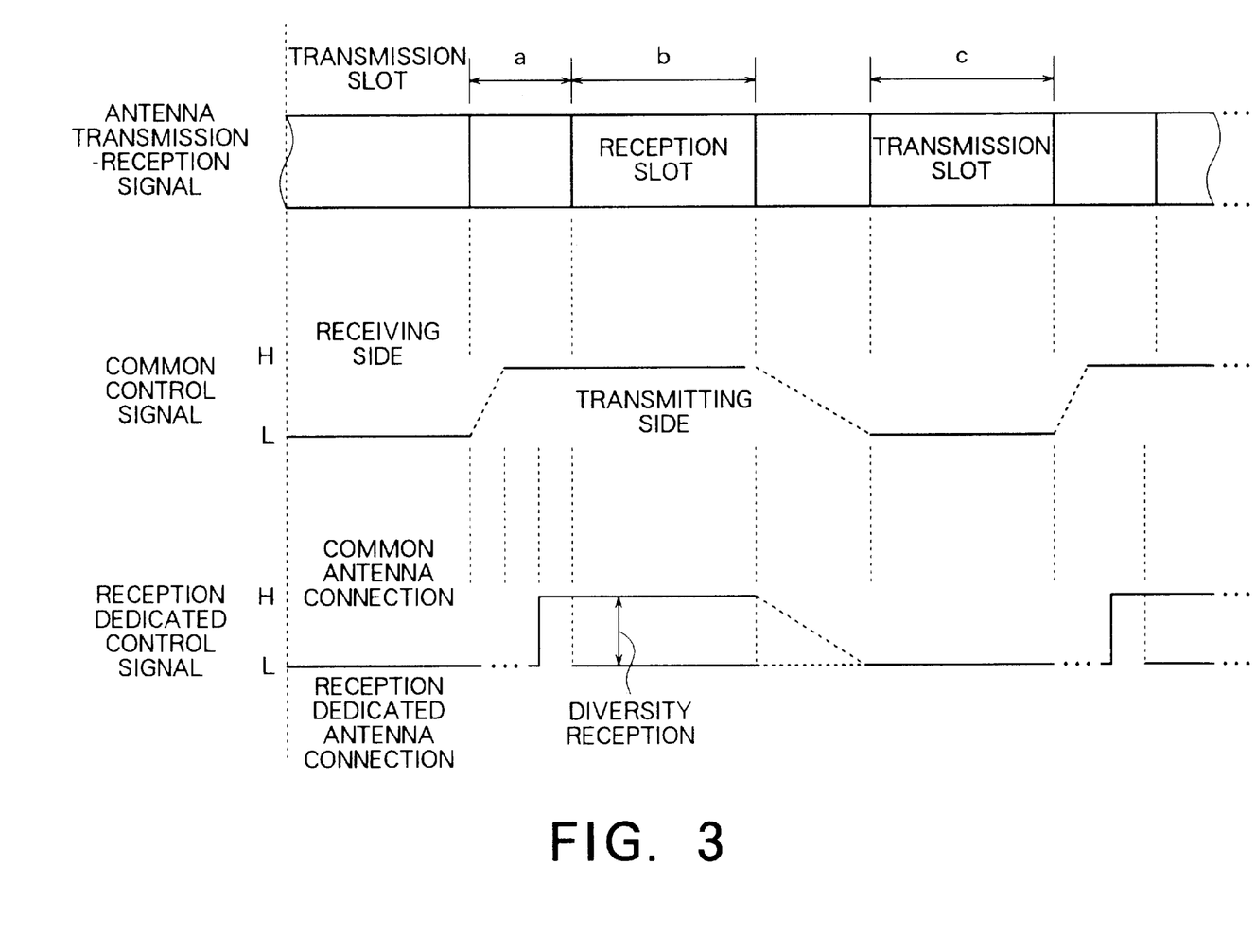
FIG. 3 is a time-chart for operation of the wireless device illustrated in FIG. 2.

Referring to FIG. 3 in addition to FIG. 2, description will be directed to operations of the wireless device, mainly switching control operation of the switch controller 11.

The burst signals generated by the burst generator 7 are arranged in time slots of antenna transmission reception signals illustrated along a top line in FIG. 3. In addition, the switch controller 11 produces two control signals one of which is a common control signal for control of the common switch 4 and the other of which is a reception dedicated control signal for control of the reception dedicated switch 3.

The switch controller 11 sends out the reception dedicated control signal to the reception dedicated switch 3 on the basis of the two RSSI signals sent from the demodulator 6 and the time slots assigned by the burst generator 7. On the other hand, the switch controller 11 sends out a common control signal to the common switch 4.

In FIG. 3, a time slot 'a' is interposed between the trailing edge of transmission slot and the leading edge of reception slot within the time slot sequence given by the burst generator 7.

In the first half or the front half of the time slot 'a', the switch controller 11 sends the reception dedicated control signal of 'L' level to the reception dedicated switch 3 with the connection condition of the transmission slot kept intact. Accordingly, the demodulator 6 at first receives a reception signal of the reception dedication side from the RF/IF receiver 5 through the reception dedicated antenna 1 and obtains the RSSI of radio signal in reception dedication side. Then, the demodulator 6 sends, to the switch controller 11, the reception dedication side RSSI signal corresponding to the reception dedication side RSSI obtained.

On the other hand, the switch controller 11 sends the common control signal of 'H' level to the common switch 4 at the trailing edge of the transmission slot to specify a leading edge of the time slot 'a'. Accordingly, the common switch 4 switches the connection with the common antenna 2 from IF/RF transmitter 9 to the reception dedicated switch 3. As a result, the common antenna 2 has been already connected to the reception dedicated switch 3 through the common switch 4 at the time when the switch controller 11 receives the reception dedicated RSSI signal.

The second half of the time slot 'a' is commenced from the time when the switch controller 11 receives the reception dedicated RSSI signal. Being responsive to the reception dedicated RSSI signal, the switch controller 11 changes the reception dedicated control signal from 'L' level to 'H' level. Accordingly, the reception dedicated switch 3 connects the common antenna 2 to the RF/IF receiver 5. As a result, the RF/IF receiver 5 receives the common side reception radio signal received from the common antenna 2 through the common switch 4. Accordingly, the RF/IF receiver 5 obtains the common side RSSI, and sends the common side RSSI signal corresponding to the obtained common side RSSI to the switch controller 11.

By such procedure described above, the switch controller 11 receives the reception dedicated RSSI signal in the first half of the time slot 'a', and then receives the common side RSSI signal in the second half. Then, the switch controller 11 compares the levels of two kinds of RSSI obtained from RSSI signals received, and selects a RSSI with higher level. furthermore, the switch controller 11 sends out the reception control signal to the reception dedicated switch 3 for the purpose of connection of RF/IF receiver 5 to the antenna corresponding to the above selected RSSI.

Accordingly, in the case where the reception dedication side RSSI has higher level, the switch controller 11 sends 'L' level reception dedicated control signal in the reception time slot 'b'. As a result, in the reception dedicated switch 3, the reception dedicated antenna 1 is connected with the RF/IF receiver 5. On the other hand, in the case where the common side RSSI has bigger level, the switch controller 11 sends 'H' level reception dedicated control signal. As a result, the reception dedicated switch 3 connects the common antenna 2 with RF/IF receiver 5.

During a transmission time slot 'c', the switch controller 11 sends 'L' level reception dedicated control signal to the reception dedicated switch 3 irrespective of any level selection of the reception dedicated antenna 1 or the common antenna 2. Accordingly, the switch controller 11 controls the reception dedicated switch 3 to connect the RF/IF receiver 5 with the reception dedicated antenna 1. On the other hand, the common control signal sent from the switch controller 11 is changed from 'H' level to 'L' level, and then the common switch 4 connects the common antenna 2 with the IF/RF transmitter 9 by switching operation.

Consequently, the transmission radio signals sent from the IF/RF transmitter 9 are transmitted in the form of a radio wave from the common antenna 2 through the common switch 4. In this case, as each of the reception dedicated switch 3 and the common switch 4 are mutually separated from each other, the transmission radio signal is never crossed into RF/IF receiver 5.

In the above description, it is possible to prevent the transmitting signals from crossing into RF/IF receiver 5 by separating the reception dedication use from the common use. The common switch 4 and the reception dedicated switch 3 are connected in series to each other between the common antenna 2 and RF/IF receiver 5.

As the most appropriate measuring sequence of the RSSI, the reception signal from the reception dedicated antenna 1 is at first designated and received in the above mentioned manner. However, a different structure may be adopted, as will be mentioned below.

Figure 4:
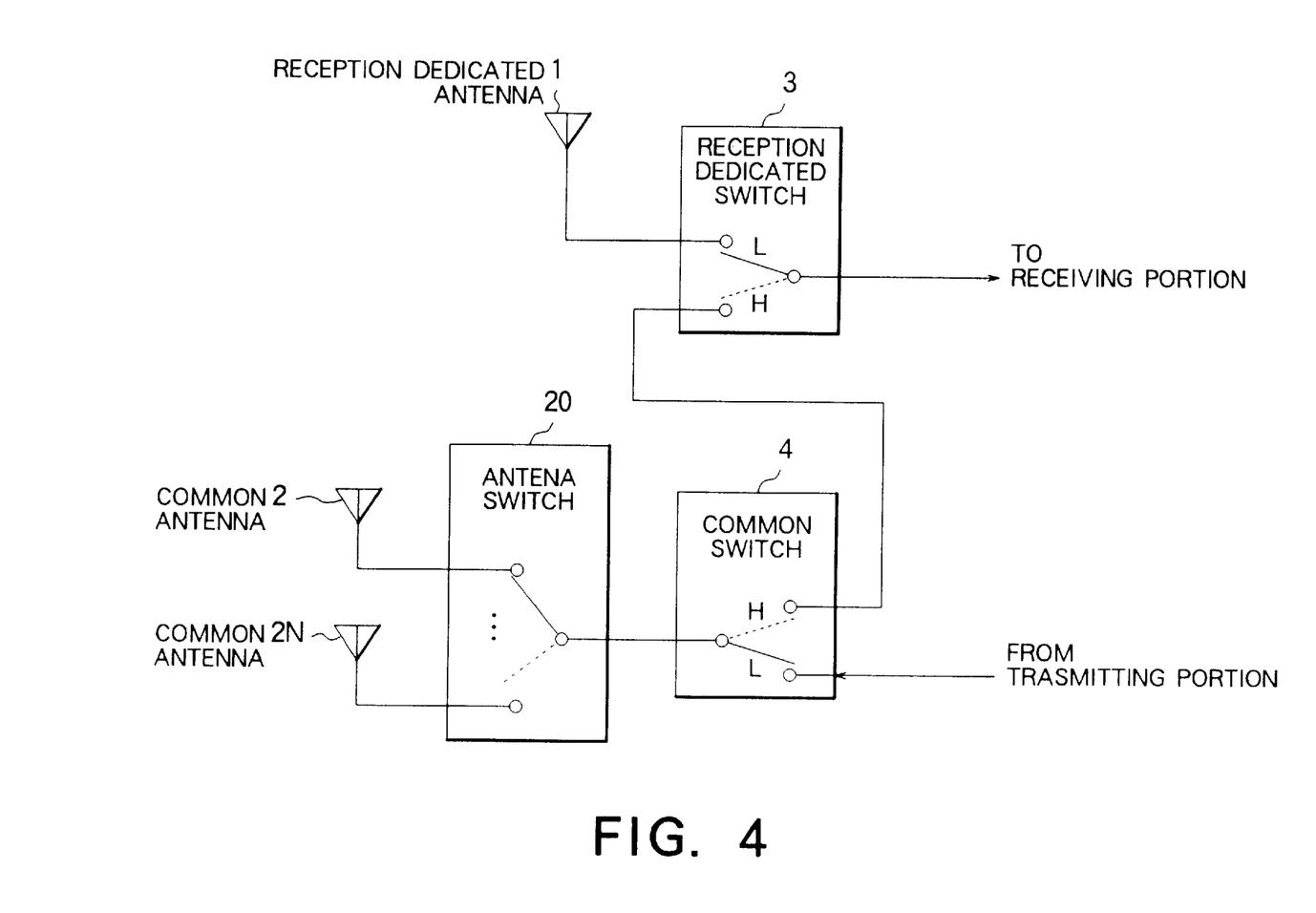
FIG. 4 is a block diagram of a wireless device according to a second embodiment of the invention.

Referring to FIG. 4, description will be made about a wireless device which has a plurality of the common antennas 2 to 2N. In this case, an antenna switch 20 is provided between the plurality of the antennas 2 to 2N and a common switch 4. The structural elements have the same functions as these illustrated in FIG. 2 except that the antenna switch 20 is included in the illustrated device and is operable in a different manner.

The antenna switch 20 connects the transmitting portion to each of the common antennas 2 to 2N which is selected on the transmission under control of the switch controller, during signal transmission. During signal reception, the reception dedicated switch 3 switches the connection between the receiving portion and the reception dedicated antenna 1 being separated from the common switch 4 under control of the switch controller. Thereafter, the antenna switch 20 sequentially connects a plurality of antennas 2 to 2N to the receiving portion through both the common switch 4 and the reception dedicated switch 3 in predetermined order.

Figure 5:
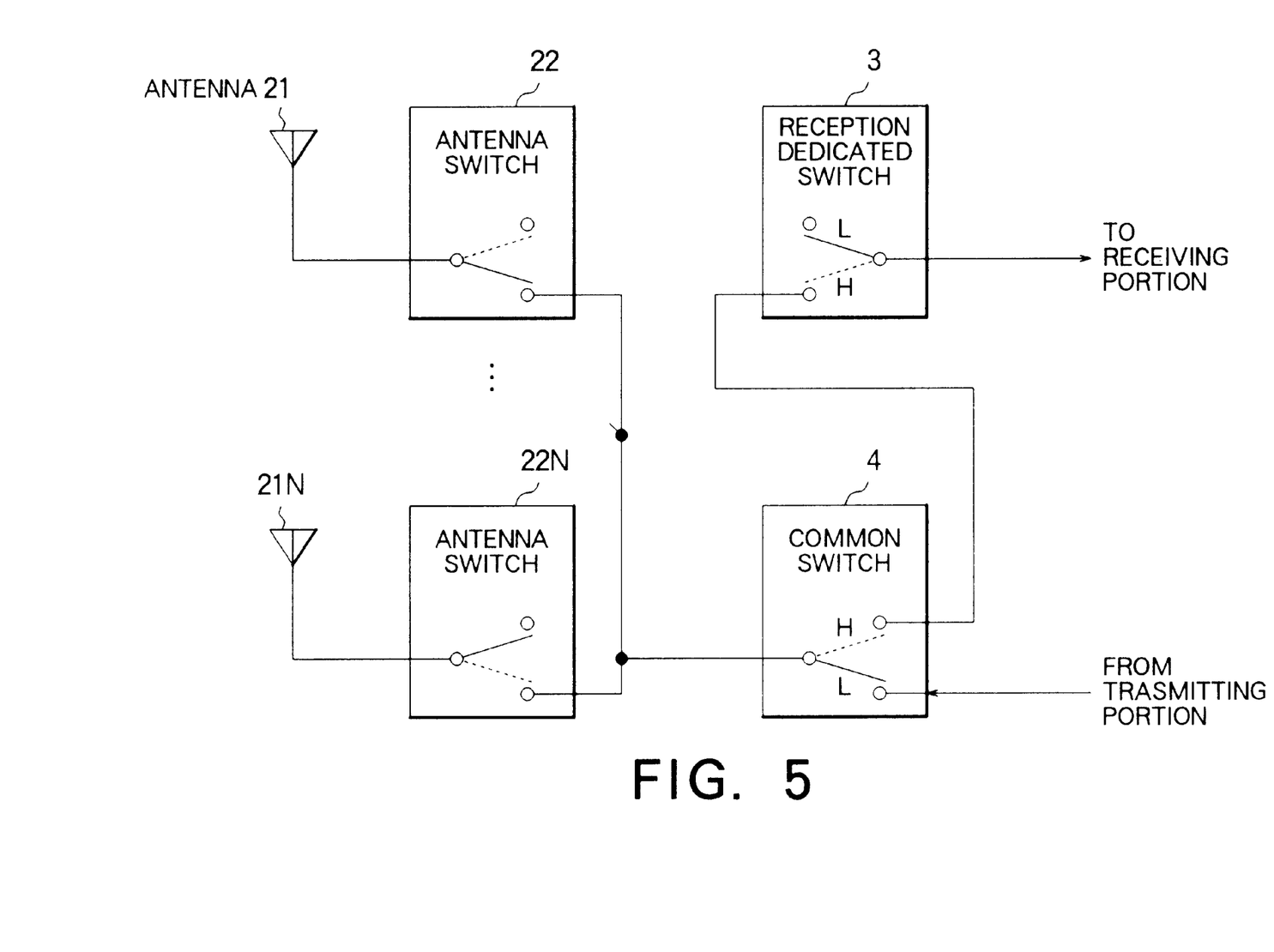
FIG. 5 is a block diagram of a wireless device according to a third embodiment of the invention.

Referring to FIG. 5, description will be made about a wireless device according to another embodiment that has a plurality of antennas 21 to 21N and antenna switches 22 to 22N different from the above description illustrated in FIG. 4. In the illustrated example, antenna switches 22 to 22N are provided with in one-to-one correspondence to the common antennas 21 to 21N, respectively, and are located between the common switch 4 and the common antenna 21 to 21N. The other elements are operable in the manner mentioned in conjunction with FIG. 2. In the embodiment illustrated in FIG. 5, a reception dedicated antenna may be also included like in the other embodiments, although not shown in FIG. 5.

As described above, the wireless device according to this invention is simple in structure composition by reason of one pair of a RF receiver and a demodulator in the receiving portion. Because no BPF is necessary, the wireless device makes it possible to prevent the any transmission signal crossing into the receiving portion. Because two switches are prepared for the receiving portion and the transmitting portion respectively. It is that, by these two switches, a connection path between each antenna and the transmitting portion is separated from a connection path of the others, especially, the receiving portion. As a result, the wireless device dispenses with any BPF designed on severe standard. Thus, the wireless device is inexpensive and small in size, and can prevent breakage of structural elements.

As any one of the antennas is selected from the plurality of antennas controlled by the switch controller, the wireless device can perform diversity reception.

Furthermore, as the reception portion calculates RSSI received from each of two antennas in the demodulator and an antenna obtained a higher level RSSI is selected by the switch controller, the wireless device can more effectively execute diversity reception.

In addition to the diversity reception, the wireless device can execute diversity transmission by using each antenna selected on the diversity reception.

What is claimed is:

1. A wireless device, operable in response to radio signals, comprising at least one antenna, transmitting means for transmitting the radio signals, and receiving means for receiving the radio signals, said wireless device further comprising:
   a common switch, provided between said at least one antenna and said transmitting means, for connecting between said transmitting means and said at least one antenna on signal transmission, and for connecting between said at least one antenna and said receiving means on signal reception;
   a reception dedicated switch, provided between said common switch and said receiving means, for connecting between said common switch and said receiving means only on signal reception;
   a single reception dedicated antenna connected to said reception dedicated switch, to be used only for signal reception; and
   a switch controller,
      for controlling said common switch to connect between said transmitting means and said at least one antenna,
      for controlling said reception dedicated switch to separate said receiving means from said common switch on signal transmission,
      for controlling both said common switch and said reception dedicated switch to connect between said receiving means and said at least one antenna, and
      for controlling said reception dedicated switch to connect between said receiving means and said reception dedicated antenna during all times of signal transmission and at the time when said reception dedicated antenna is designated on signal reception.

2. A wireless device as claimed in claim 1, further comprising:
   said at least one antenna further comprising a plurality of antennas;
   an antenna switch, for connecting between said common switch and one of said plurality of antennas that is designated; and
   said switch controller controls said antenna switch to connect between said common switch and one of said plurality of antennas that is designated by time slots assigned to signal reception and signal transmission respectively.

3. A wireless device as claimed in claim 1, wherein said switch controller controls said switches to connect sequentially between all of said antennas and said receiving means on signal reception.

4. A wireless device as claimed in claim 1, wherein:
   said receiving means measures RSSI (received signal strength intensity) of radio signals sequentially received from all of said antennas and informs said switch controller of RSSI;
   said switch controller
      controls said switches to connect between said receiving means and all of said antennas sequentially according to previous designation,
      receives and compares RSSI from said receiving means,
      selects one of said antennas with highest RSSI before the time slot of signal reception, and
      controls said switches to connect between said receiving means and said selected antenna on signal reception.

5. A wireless device as claimed in claim 1, wherein said switch controller controls said reception dedicated switch to first connect between said receiving means and said reception dedicated antenna and then to connect between said receiving means and said common switch before the time slot of signal reception.

6. A wireless device as claimed in claim 1, wherein:
   said at least one antenna further comprises a plurality of common antennas;
   at least one antenna switch for connecting between said common switch and one of said plurality of antennas;
   said receiving means measures RSSI of radio signals sequentially received from all of said antennas and informs said switch controller of RSSI; and
   said switch controller
      controls said reception dedicated switch to first connect between said receiving means and said reception dedicated antenna sequentially,
      controls all of said switches to connect between said receiving means and each antenna of said plurality of common antennas sequentially according to previous designation, receives and compares RSSI from said receiving means, selects one of said antennas with highest RSSI before the time slot of signal reception, and controls said switches to connect between said receiving means and said selected antenna on signal reception.

7. A wireless device comprising a plurality of antennas, transmitting means for transmitting transmission radio signals, and receiving means for receiving reception radio signals, said wireless device being operable to avoid cross components between the antennas on transmitting the transmission radio signals from the transmitting means and further comprising:

a common switch, provided between a selected one of the antennas and said transmitting means, for connecting between said transmitting means and the selected one of said antennas that is designated on signal transmission, and for connecting between each of said antennas and said receiving means on signal reception;

a reception dedicated switch, provided between said common switch and said receiving means and between another one of the antennas and the receiving means, for connecting between said common switch and said receiving means and between another one of the antennas and the receiving means, only on signal reception; and a switch controller, for controlling said common switch and the reception dedicated switch to connect between said transmitting means and the selected one of said antennas and to connect between the receiving means and said another one of the antennas, for controlling said reception dedicated switch to separate said receiving means from said common switch on signal transmission and to thereby prevent the transmission radio signals from being crossed on said another one of the antennas, and for controlling both said common switch and said reception dedicated switch to connect between said receiving means and both said selected and said another antennas on signal reception.

8. A wireless device, operable in response to radio signals, comprising at least one antenna, transmitting means for transmitting the radio signals, and receiving means for receiving the radio signals, said wireless device further comprising:

a common switch, provided between said at least one antenna and said transmitting means, for connecting between said transmitting means and said at least one antenna on signal transmission, and for connecting between said at least one antenna and said receiving means on signal reception;

a reception dedicated switch, provided between said common switch and said receiving means, for connecting between said common switch and said receiving means only on signal reception;

a single reception dedicated antenna connected to said reception dedicated switch to be used only for signal reception; and a switch controller, for controlling said common switch to connect between said transmitting means and said at least one antenna, for controlling said reception dedicated switch to separate said receiving means from said common switch on signal transmission, for controlling both said common switch and said reception dedicated switch to connect between said receiving means and said at least one antenna, for controlling said reception dedicated switch to connect between said receiving means and said reception dedicated antenna during all times of signal transmission and at the time when said reception dedicated antenna is designated on signal reception, and for controlling said reception dedicated switch to connect at first between said receiving means and said reception dedicated antenna and then to connect between said receiving means and said common switch before the time slot of signal reception.

9. A wireless device, operable in response to radio signals, comprising at least one antenna, transmitting means for transmitting the radio signals, and receiving means for receiving the radio signals, said wireless device further comprising:

a common switch, provided between said at least one antenna and said transmitting means, for connecting between said transmitting means and said at least one antenna on signal transmission, and for connecting between said at least one antenna and said receiving means on signal reception;

a reception dedicated switch, provided between said common switch and said receiving means, for connecting between said common switch and said receiving means only on signal reception;

said at least one antenna further comprises a plurality of common antennas;

at least one antenna switch for connecting between said common switch and one of said plurality of common antennas;

a single reception dedicated antenna connected to said reception dedicated switch, to be used only for signal reception;

said receiving means measures RSSI of radio signals sequentially received from all of said antennas and informs said switch controller of RSSI; and a switch controller, for controlling said common switch to connect between said transmitting means and one of said plurality of common antennas, for controlling said reception dedicated switch to separate said receiving means from said common switch on signal transmission, for controlling both said common switch and said reception dedicated switch to connect between said receiving means and said plurality of common antennas, for controlling said reception dedicated switch to first connect between said receiving means and said reception dedicated antenna sequentially, for controlling said common switch and said reception dedicated switch to connect between said receiving means and each common antenna sequentially according to previous designation, for receiving and comparing RSSI from said receiving means, for selecting one of said antennas with highest RSSI before the time slot of signal reception, and for controlling said common switch and said reception dedicated switch to connect between said receiving means and said selected antenna on signal reception.

* * * * *